(12) United States Patent
Pajak et al.

(10) Patent No.: US 9,140,391 B2
(45) Date of Patent: Sep. 22, 2015

(54) COUPLER METHOD AND APPARATUS FOR INSTALLING PIPE WITH A PROTECTIVE COVER INTO BOREHOLE

(71) Applicant: UPSCO, Inc., Moravia, NY (US)

(72) Inventors: Daniel E. Pajak, Skaneateles, NY (US); Andrew P. Boos, Skaneateles, NY (US); Christian D. Kane, New Paltz, NY (US)

(73) Assignee: UPSCO, Inc., Moravia, NY (US)

( * ) Notice: Subject to any disclaimer, the term of this patent is extended or adjusted under 35 U.S.C. 154(b) by 0 days.

(21) Appl. No.: 13/787,359

(22) Filed: Mar. 6, 2013

(65) Prior Publication Data
US 2013/0313825 A1      Nov. 28, 2013

Related U.S. Application Data

(60) Provisional application No. 61/650,832, filed on May 23, 2012.

(51) Int. Cl.
| | |
|---|---|
| *F16L 21/06* | (2006.01) |
| *F16L 1/028* | (2006.01) |
| *F16L 57/06* | (2006.01) |
| *F16L 7/00* | (2006.01) |
| *E21B 17/10* | (2006.01) |

(52) U.S. Cl.
CPC ............... *F16L 21/06* (2013.01); *E21B 17/10* (2013.01); *E21B 17/105* (2013.01); *F16L 1/028* (2013.01); *F16L 7/00* (2013.01); *F16L 21/065* (2013.01); *F16L 57/06* (2013.01)

(58) Field of Classification Search
CPC ........... F16L 21/06; F16L 35/00; F16L 57/00; E21B 17/105
USPC ................. 405/157; 285/45, 53, 55; 138/110
See application file for complete search history.

(56) References Cited

U.S. PATENT DOCUMENTS

| | | | | |
|---|---|---|---|---|
| 968,759 | A | * | 8/1910 | Fogg .......................... 292/307 B |
| 2,628,134 | A | * | 2/1953 | Williams et al. ........... 175/325.7 |
| 4,079,966 | A | * | 3/1978 | Berry et al. ...................... 285/24 |
| 4,284,298 | A | * | 8/1981 | Kaufmann, Jr. ............... 285/302 |
| 4,445,716 | A | * | 5/1984 | Hoffman ......................... 285/55 |
| 4,741,559 | A | * | 5/1988 | Berghman ....................... 285/45 |
| 4,923,222 | A | * | 5/1990 | Deshazer et al. .......... 285/124.1 |
| 4,983,449 | A | | 1/1991 | Nee |
| 5,015,013 | A | * | 5/1991 | Nadin .............................. 285/64 |
| 5,095,981 | A | * | 3/1992 | Mikolajczyk .............. 166/241.6 |
| 5,099,889 | A | | 3/1992 | Ratzlaff |
| 5,480,193 | A | * | 1/1996 | Echols et al. ................... 285/45 |
| 5,713,392 | A | | 2/1998 | O'Rourke |

(Continued)

FOREIGN PATENT DOCUMENTS

CA       2517980 A1    4/2005

*Primary Examiner* — Tara M. Pinnock
(74) *Attorney, Agent, or Firm* — Harris Beach PLLC

(57) ABSTRACT

A coupler apparatus for installing a pipe and a protective cover into a borehole includes a first coupler half and a second coupler half. Both halves include a leading edge and at least one slot disposed in an outer surface configured to allow a fluid to pass by the coupler apparatus as the coupler apparatus is pulled through the borehole. A fastening means joins the first coupler half to the second coupler half about the pipe and the protective cover. The coupler apparatus formed by the first coupler half joined to the second coupler is configured to capture the protective cover at a location on the pipe for the installation of the pipe with the protective cover into the borehole. A method is also described.

10 Claims, 6 Drawing Sheets

(56) References Cited

U.S. PATENT DOCUMENTS

| | | | | |
|---|---|---|---|---|
| 5,806,615 | A * | 9/1998 | Appleton | 175/325.7 |
| 5,971,667 | A * | 10/1999 | Graham | 405/184 |
| 5,988,227 | A | 11/1999 | Magoffin | |
| 6,739,415 | B2 * | 5/2004 | Mitchell et al. | 175/325.5 |
| 6,983,767 | B2 * | 1/2006 | Rickards | 138/110 |
| 7,093,858 | B1 * | 8/2006 | Russell | 285/28 |
| 7,100,641 | B2 * | 9/2006 | Tyrer et al. | 138/110 |
| 7,168,451 | B1 * | 1/2007 | Dundas | 138/110 |
| 2007/0053749 | A1 * | 3/2007 | Jarvis et al. | 405/154.1 |
| 2008/0302436 | A1 | 12/2008 | Elowitz | |
| 2009/0223584 | A1 * | 9/2009 | Gray | 138/109 |

\* cited by examiner

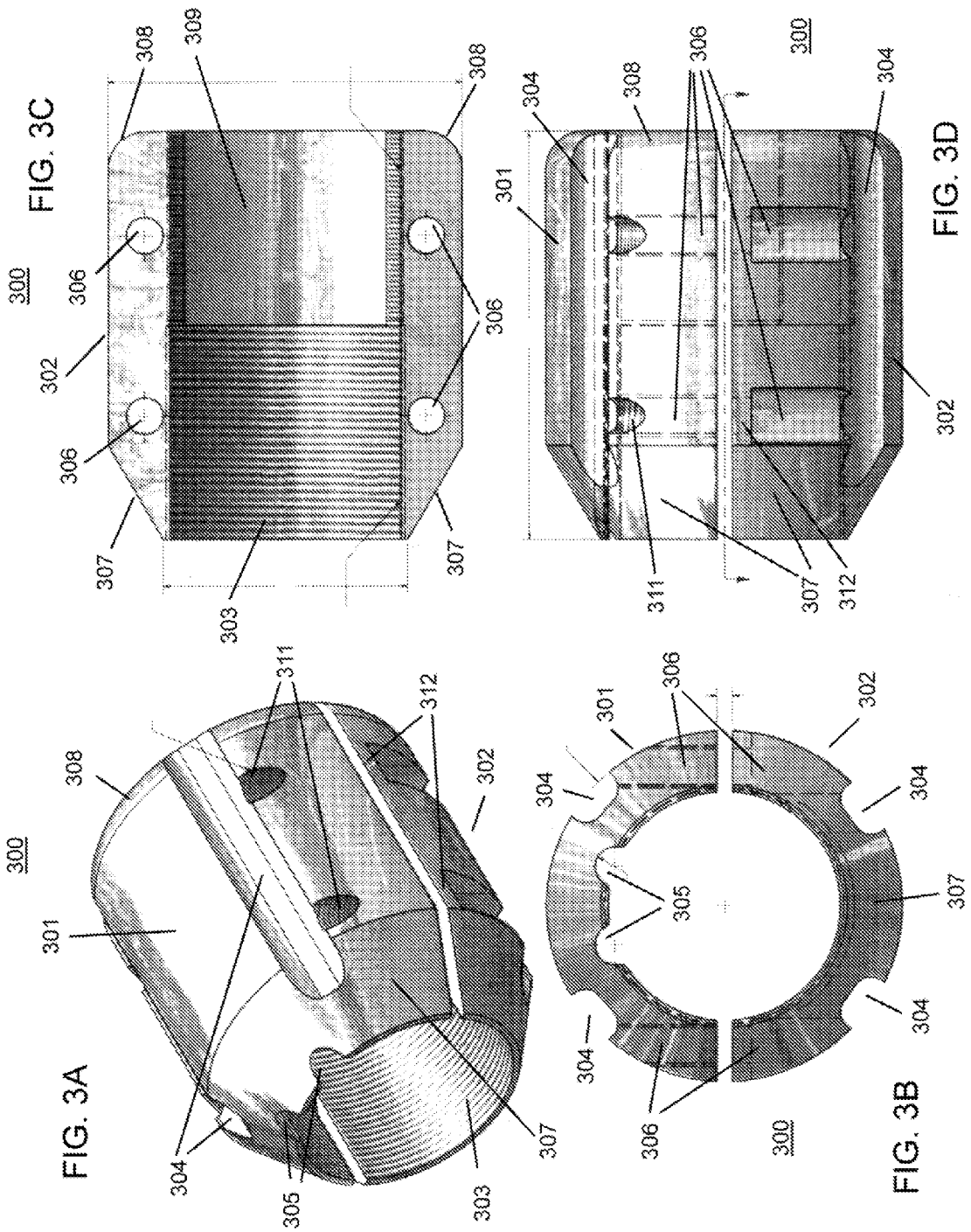

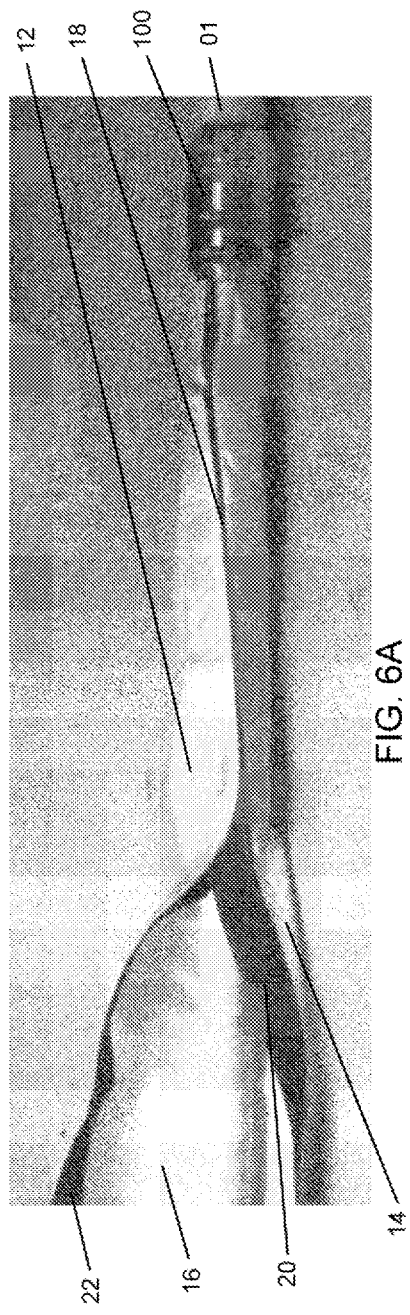
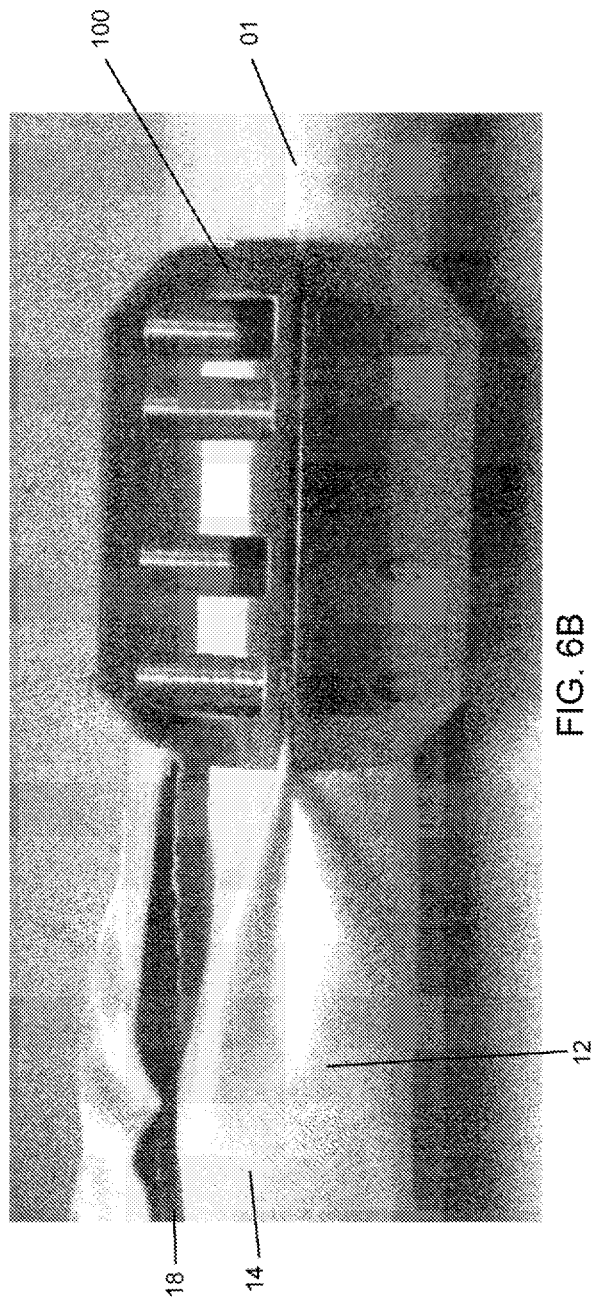
FIG. 6A
FIG. 6B

COUPLER METHOD AND APPARATUS FOR INSTALLING PIPE WITH A PROTECTIVE COVER INTO BOREHOLE

CROSS-REFERENCE TO RELATED APPLICATIONS

This application claims priority to and the benefit of co-pending U.S. provisional patent application Ser. No. 61/650,832, METHOD AND APPARATUS FOR PROTECTING PIPE INSTALLED UNDERGROUND AFTER HORIZONTAL DRILLING, filed May 23, 2012, which application is incorporated herein by reference in its entirety. This application is related to U.S. patent application Ser. No. 13/787,222, METHOD AND APPARATUS FOR PROTECTING PIPE INSTALLED UNDERGROUND, filed Mar. 6, 2013, which application is incorporated herein by reference in its entirety.

FIELD OF THE INVENTION

The invention relates to a coupler method and apparatus for installing pipe into a borehole and more particularly to a method and apparatus which minimizes damage to the pipe and any other components being simultaneously installed in the borehole or existing host pipe, casing or conduit.

BACKGROUND OF THE INVENTION

Directional drilling (also referred to in the art as "horizontal drilling" or "horizontal directional drilling") was invented in the 1920s and the technology was originally used in oil fields to increase oil production. In the 1990s, directional drilling technology was adapted for utility installations. Directional bores have been installed for pipelines carrying oil, natural gas, petrochemicals, water, sewage, and other products. Also, directionally drilled holes have been used to install conduits which carry electric and fiber optic cables. Such continuous pipes, conduits, casings and the like are referred to hereinafter generally as "pipe".

Besides crossing under highways, railroads, airport runways, shore approaches, traffic islands, and areas congested with buildings; directionally drilled installations have been made under rivers and waterways, pipeline corridors, and protected wetlands. Directional borings have the least environmental impact of any alternate construction method. Directional drilling technology also allows placement of pipe under obstacles, provides maximum protection for the installation, and minimizes maintenance costs. During installation, normal business operations are usually not interrupted. Directional borings also have a predictable and short construction schedule.

Typically, after a directional boring pass is complete, a permanent pipe (e.g. a gas pipe, conduit, or casing of some sort) is pulled or pushed through the boring also known as a borehole. In the prior art, the pipe, which may be formed of, for example, metal or plastic, is not necessarily provided with exterior chafe protection prior to being inserted into the boring and thus, the pipe and any pipe coatings are vulnerable to damage from contact with protruding rocks and the like.

Many utility distribution piping and cable systems are buried underground throughout the world. Older piping systems were often formed of cast iron or bare steel pipe. Newer systems may include coated steel or polyethylene. Older systems may also tend to be in urban or congested areas under asphalt or concrete paving that would render the replacing or rehabilitating such pipes expensive and disruptive to surface activities. Sliplining or host pipe insertion has also been used as a method for rehabilitation of existing pipelines to repair leaks or restore structural stability. Sliplining is completed by installing a smaller, "carrier pipe" into a larger "host pipe." The carrier pipe may be continuous along an entire run of pipeline or consist of multiple segments of pipe that are joined or fused end to end. Common material used to slipline an existing pipe include medium and high density polyethylene (HDPE), fiberglass reinforced pipe and poly vinyl chloride (PVC). A host pipe may include debris, slag, burrs or sharp internal edges between pipe segments, as well as internal projections or coupons at service connection fittings that may damage or score the external surface of the carrier pipe as it is inserted within the host pipe.

As described in CA Patent No. 2517980C, hoses have been used as protective sleeves for borehole pipe installation. However, such relatively flexible materials, such as fire hoses, polyester materials, and other relatively loose weave materials, are water absorbent and can be difficult to install once water logged. Also, post-installation ingress of water and other ground contaminants such as petrochemicals cause pipe corrosion and/or degradation and in some cases ultimately pipe failure. Such pre-formed hoses can be difficult and time consuming to pull over pipes being prepared into pipe-hose assemblies for installation into the borehole. Post-installation, such hoses can be subject to undesirable permanent bonding between the pipe, the hose, and the surrounding soil matrix.

A coupler may be used to hold a protective sleeve on a pipe during insertion of the pipe-protective sleeve assembly. A coupler may also be used to hold an electrical tracer wire which can be installed into the borehole along with the pipe-protective sleeve assembly. Unfortunately, some physical damage to the protective sleeve and/or the tracer wire is common.

There is a need for a coupler method and apparatus to substantially eliminate damage to the protective sleeve and tracer wire at or near a coupler during insertion into a borehole and to protect carrier pipe during host pipe insertion or sliplining.

SUMMARY OF THE INVENTION

According to one aspect, a coupler apparatus for installing a pipe and a protective cover into a borehole or host pipe includes a first coupler half and a second coupler half. Both halves include a leading edge and at least one slot and/or flute disposed in an outer surface configured to allow a fluid to pass by the coupler apparatus as the coupler apparatus is pulled through the borehole or host pipe. A fastening means joins the first coupler half to the second coupler half about the pipe and the protective cover. The coupler apparatus formed by the first coupler half joined to the second coupler is configured to capture the protective cover at a location on the pipe for the installation of the pipe with the protective cover into the borehole or host pipe.

In one embodiment, the protective cover includes a sock.

In one embodiment, the coupler apparatus is affixed to the pipe at a distance from an end of the pipe.

In another embodiment, the distance is greater than about six inches.

In yet another embodiment, the leading edge includes a slope configured to stabilize a soil matrix as the pipe and the protective cover is inserted into the borehole.

In yet another embodiment, at least a selected one of the first coupler half and the second coupler half further includes at least one slot to clamp a tracer wire.

In yet another embodiment, the fastening means includes a plurality of bolts.

In yet another embodiment, at least a selected one of the first coupler half and the second coupler half further includes a transverse slot.

In yet another embodiment, at least a selected one of the first coupler half and the second coupler half further includes a plurality of serrated features.

In yet another embodiment, at least a selected one of the first coupler half and the second coupler half further includes a substantially smooth section configured to protectively capture a seam.

In yet another embodiment, the first coupler half and the second coupler half includes steel.

In yet another embodiment, the steel includes an AISI 1144 Carbon Steel.

According to another aspect, a method includes the steps of: providing a pipe and a protective cover to be installed underground; providing a first coupler half and a second coupler half; affixing the first coupler half to the second coupler half about the pipe and the protective cover to capture the protective cover at a location on the pipe, the location on the pipe about six inches or more from an end of the pipe; affixing an installation apparatus substantially at the end of the pipe; and installing the pipe and the protective cover underground.

In one embodiment, the protective cover includes a sock.

In another embodiment, the step of installing the pipe and the protective cover underground further includes passing a fluid through at least one slot disposed in the first coupler half and the second coupler half.

In yet another embodiment, the step of installing the pipe and the protective cover into the borehole further includes packing or stabilizing a soil matrix using a leading sloped edge of the first coupler half and the second coupler half as the pipe and the protective cover is inserted into the borehole.

In yet another embodiment, the step of affixing the first coupler half to the second coupler half about the pipe and the protective cover further includes affixing the first coupler half to the second coupler half about at least one tracer wire clamped within a tracer wire slot.

In yet another embodiment, the method further includes after the step of installing the pipe and the protective cover underground a step of removing the first coupler half and the second coupler half.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3A, shows an isometric view of one exemplary coupler;

FIG. 3B shows an end view of the coupler of FIG. 3A;

FIG. 3C show a view of an inner surface of a second half of the coupler of FIG. 3A;

FIG. 3D a side view of the coupler of FIG. 3A;

FIG. 6A shows an illustration of the coupler capture of a sock to a pipe during the formation of the sock seam; and FIG. 6B shows a close up illustration of the coupler of FIG. 6A.

DETAILED DESCRIPTION

Figure 1:
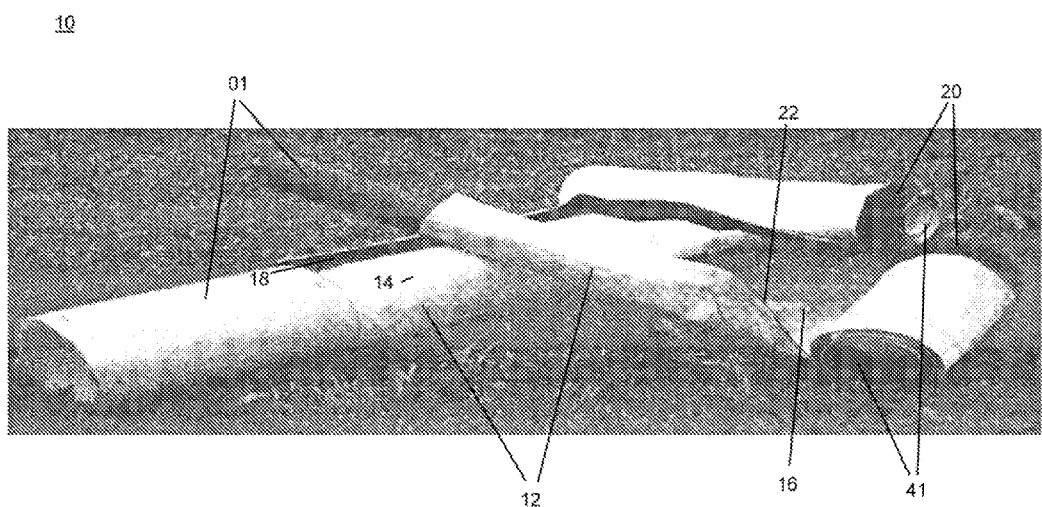
FIG. 1 shows an illustration of two exemplary short cut-off sections of pipes which are partially covered by a protective material.

As described hereinabove, protection methods of the prior art for pipe insertion into boreholes and host pipes have a number of problems. Although directional drilling for a pipe installation can be useful and advantageous in many applications, directional drilling suffers from drawbacks. For example pipes installed following directional drilling can be exposed to lateral hazards such as projecting rocks as well as subjected to longitudinal scraping, chafing of the pipe exterior against projecting rocks due to thermal cycles, or subterranean erosion during the working life of the installation. Scratching or chafing may damage or partially remove protective coatings on the exterior of the pipe. In severe cases, the structural integrity of the pipe wall can be compromised. In some worst case scenarios, such as, poly pipes carrying natural gas, the consequence of catastrophic pipe failure can be loss of life and property. A sock and a method of installation which solve the problem of damage to pipes installed in boreholes as well as the water ingress problem is described in co-pending U.S. patent application Ser. No. 13/787,222, METHOD AND APPARATUS FOR PROTECTING PIPE INSTALLED UNDERGROUND, which application is incorporated herein by reference in its entirety for all purposes.

Host pipe insertion suffers from similar problems. For example carrier pipes installed within an existing host pipe can be exposed to lateral hazards such as burrs or sharp edges from host pipe joints, slag, debris or projections from existing or discontinued service connections that may cause longitudinal scraping, chafing of the exterior of the carrier pipe. Scratching or chafing can damage or partially remove protective coatings on the exterior of the pipe or compromise the structural integrity of the carrier pipe.

Typically a coupler apparatus is used to attach anything being drawn into a borehole with a pipe, such as a protective sleeve and/or a tracer wire. For example, in CA Patent No. 2517980C, in the preferred embodiment, the coupler is preferably located at an end of the pipe and the pipe assembly is comprised of the coupler described above and the pull head is connected with the coupler. However, as described hereinabove, using the prior art method of placing the coupler at or very near a pull head often results in damage to any of the components being simultaneously installed into a borehole, such as, for example, a protective sleeve and/or a tracer wire.

During development of the sock described in METHOD AND APPARATUS FOR PROTECTING PIPE INSTALLED UNDERGROUND AFTER HORIZONTAL DRILLING as cited hereinabove, it was realized that such damage near the coupler is often caused by an angular deflection of the pipe near the installation apparatus connection to the pipe being inserted into the borehole (e.g. near a pull head). The reason for the angular deflection near the end of the pipe being inserted into the borehole is believed to be buoyancy of an air filled pipe in any water and/or drilling slurry fluid in the borehole. Once the problem of pipe buoyancy was understood, a new method of placing the coupler apparatus some distance from the end of the pipe was developed. In further testing, the coupler was typically placed more than about six inches, preferably about two feet or more back from the end of the pipe being pulled into a borehole by an installation apparatus. Since the method was improved, there have been no further instances of damage to either the sock or one or more tracer wires being simultaneously pulled into a borehole. Effective distances for the coupler from the end of the pipe can range from about half a foot (six inches) to several feet depending on the type of pipe, the diameter of the pipe and the conditions in the borehole. For example, for polyethylene pipes of about two or three inches in diameter, about a two feet distance between the end of a pipe and the coupler apparatus has been found to substantially eliminate any damage to any item being carried by a coupler.

To better understand the features of the coupler apparatus according to the invention, the protective sock is briefly described first. FIG. 1 shows two exemplary short cut-off sections of protected pipes which are partially covered by a protective material to illustrate an exemplary embodiment of a protective cover (referred to hereinbelow as a "sock"). Sock 12, a pipe protection apparatus, includes a sleeve having an outer surface 14 and an inner surface 16. Sock 12 is formed from a length of material (e.g. a woven fabric) having a width in a width direction perpendicular to a longer longitudinal, length direction. The sheet of material (e.g. a sheet of sock fabric) can be conveniently provided as a roll 41 (e.g. roll of sheet of sock fabric). A sock fabric of any suitable width dimension can also be provided on a bobbin, such as, for example, an industrial bobbin, or on any other suitable form. In some embodiments, a relatively light weight sock fabric can be carried to an installation site as a loose roll or in any suitable fold (e.g. an accordion fold). During installation of a sock 12 onto pipe 01, the length of material can be manually or machine rolled in its short direction (i.e. the width dimension, perpendicular to the longitudinal direction) to substantially wrap around to conform in a non-bonding way to the diameter of the pipe to be protected, as seam 18 is closed along the longitudinal direction. Typically, the sock 12 can be formed manually by hand. However, in some installations, there could be an automated or semi-automated installation of a sock onto a pipe by machine.

The pipe of a pipe-sock assembly can be attached to any suitable apparatus for emplacing the pipe and sock into a previously drilled hole. The apparatus can insert the pipe and sock into the hole together. When the pipe is properly positioned within the hole, the apparatus can then be disconnected from the pipe and the sock leaving the installed pipe covered by sock 12 in the hole and ready for service.

Figure 2:
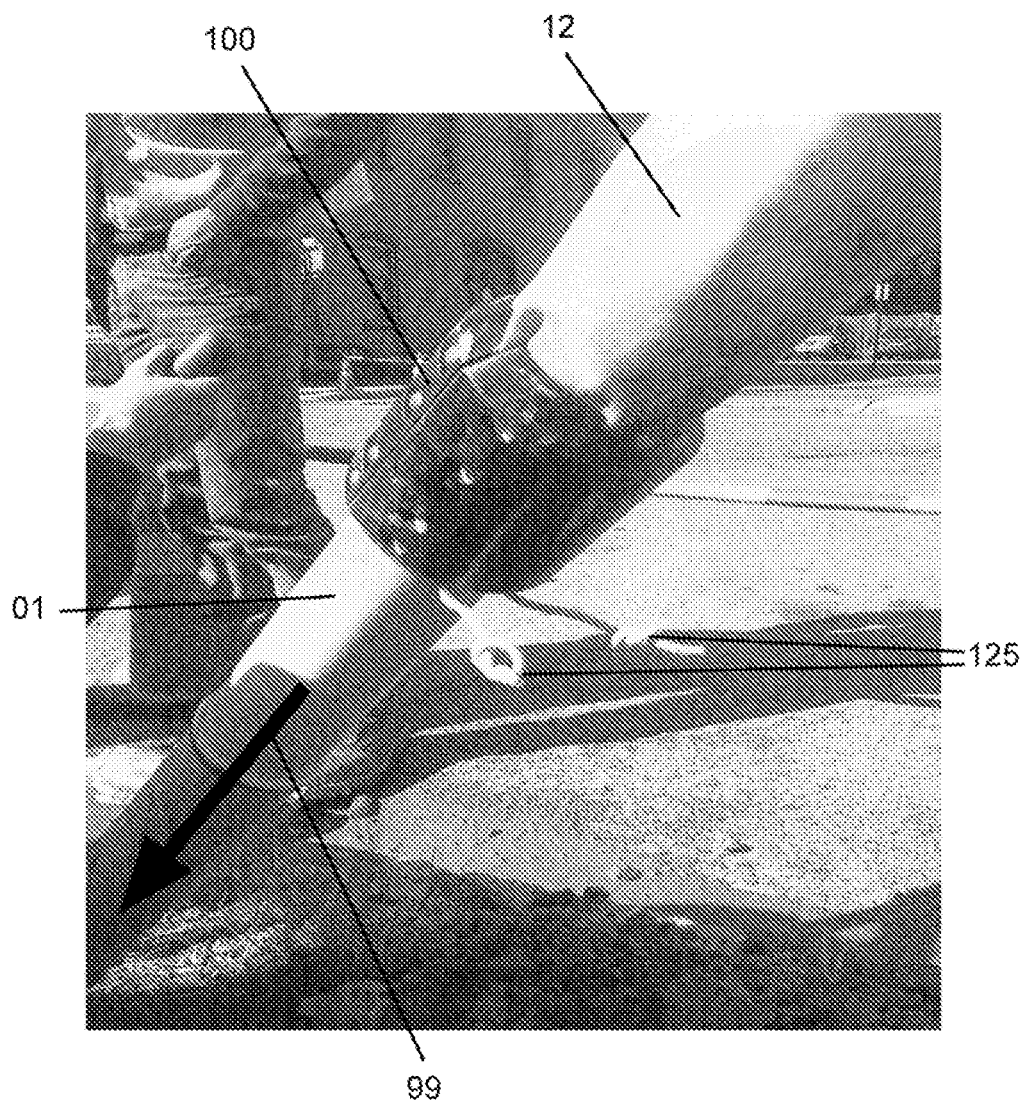
FIG. 2 shows an illustration of one exemplary installation of a sock and pipe assembly into a borehole.

FIG. 2 shows an illustration of one exemplary installation of a sock 12 into a borehole (lower left, not shown). Arrow 99 represents the direction of travel of pipe 01 and sock 12 into the borehole. Coupler 100 holds sock 12 to pipe 01 as the assembly of sock 12 and pipe 01 is pulled into the borehole. Typically, the apparatus to install the pipe-sock assembly (e.g. a pull-head) is affixed to pipe 01 and not to the coupler 100, which is located a distance from the end of the pipe 01. Also visible are tracer wires 125, electrical conductors used post-installation for remote sensing of the location of the underground pipe. Seam 18 (FIG. 1) is not visible in FIG. 2.

Any suitable apparatus (e.g. an apparatus including a pipe pull head) as known to those skilled in the art can be used to insert pipe 01 into the borehole. In the exemplary installation of FIG. 2, coupler 100 is mechanically coupled by frictional forces to both pipe 01 and sock 12. In this embodiment, coupler 100 rides into the borehole along with pipe 01 and the installation apparatus is not directly connected to either coupler 100 or sock 12. According to the inventive method, coupler 100 has been placed about two feet back from the end of the pipe (the end of the pipe is not visible in the lower left of FIG. 2). Using this method, it has been found that both sock 12 and tracer wires 125 will substantially suffer no damage during installation into the borehole. Once installed in place in the borehole, re-usable coupler 100 is typically removed from the pipe-sock assembly.

Now turning in more detail to the coupler apparatus according to the invention, FIG. 3A, shows an isometric view of one exemplary coupler 300, FIG. 3B shows an end view of the coupler of FIG. 3A, FIG. 3C show a view of an inner surface of a second half of the coupler of FIG. 3A, and FIG. 3D a side view of the coupler of FIG. 3A. As discussed hereinabove, coupler 300 can hold captive to a location on a pipe, a protective sock and one or more tracer wires during insertion into a borehole. A coupler 300 can be installed on a pipe and protective sock such as by using a plurality of machine screws or bolts. In the example of coupler 300, four bolts are inserted into holes 306. The heads of the bolts rest on shoulders 312 which are an integral part of the coupler half 302. The threads of the bolts are captured by threaded sections 311, threaded into holes 306 of coupler half 301. As will be understood by those skilled in the art, any suitable number of bolts of any suitable size can be used to join the coupler halves together. For example, larger couplers used with larger pipes can use larger diameter bolts and/or more bolts. It is unimportant which coupler half carries a through hole for a bolt and which half is threaded. It is also contemplated that in some coupler embodiments there could be other fastening means to join the two coupler halves together. For example, there could be one or more latches or one or more tongue and groove type engagement on one side with one or more latches on the opposite side of the coupler.

The leading sloped edge 307 of both halves of the coupler apparatus helps to expand the soil matrix as the pipe and a protective cover (e.g. a pipe-sock assembly) is inserted into the borehole. The trailing edge 308 is relatively smooth to both facilitate travel in the borehole as well as to minimize damage from a sharp edge prior and after installation of the pipe-sock assembly. Smooth edges such as trailing edge 308 can also help to reduce forces that might fracture the coupler material. Slots 304 allow drilling fluids such as drilling slurry and/or water to pass as the coupler is inserted into the borehole. Without such slots 304, liquid could be forced in column within the borehole, causing pull forces to be higher than needed.

Inner slots 305 can be used to protect one or more tracer wires during installation of a pipe-sock-tracer wire assembly into a borehole. Typically one tracer wire can be placed in one slot, so there could be one or two tracer wires installed using the coupler embodiment of FIG. 3A. Where more than two tracer wires or any other wires are used alongside a pipe, more than two slots 305 can be provided.

Now, turning to the second coupler half of FIG. 3C, when the first coupler half is joined to the second coupler half, the serrated features of serrated section 303 are designed to achieve a locking hold on the pipe. While the first coupler half can have two such serrated sections, in some embodiments as shown in FIG. 3C, half of the inner surface of a second coupler have can be made relatively smooth without the serrated section. The smooth section 309 can capture the portion of the sock having the seam in a way that does not damage the seam.

Example 1

A coupler according to FIG. 3A was fabricated for use with a 241 pipe and protective mesh sock. It was built to be closed by four 3/8-16UNC bolts. The inner diameter was 2.55" and the outer diameter was 3.7". The radius of the tracer wire slots was 0.21". The coupler length was 4.3".

Figure 4B:
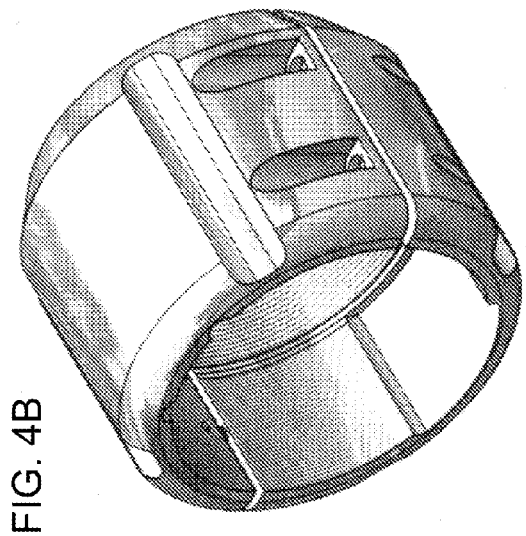
FIG. 4B shows a trailing edge isometric view of the coupler of FIG. 4A.
Figure 4A:
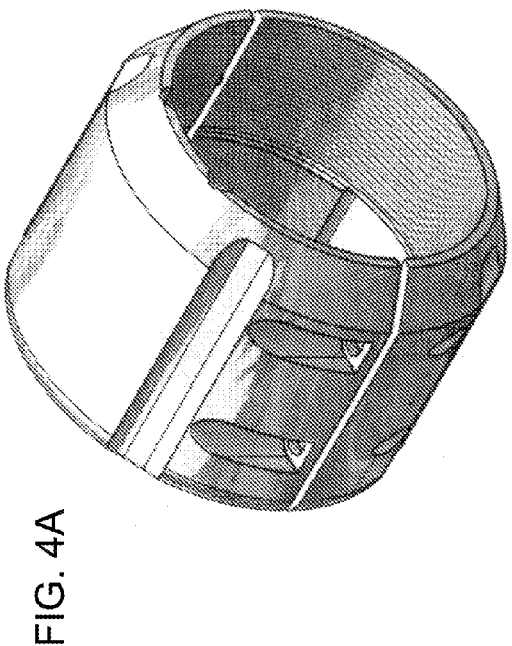
FIG. 4A shows an isometric leading edge view of another exemplary embodiment of a coupler similar to the design of FIG. 3A.
Figure 4D:
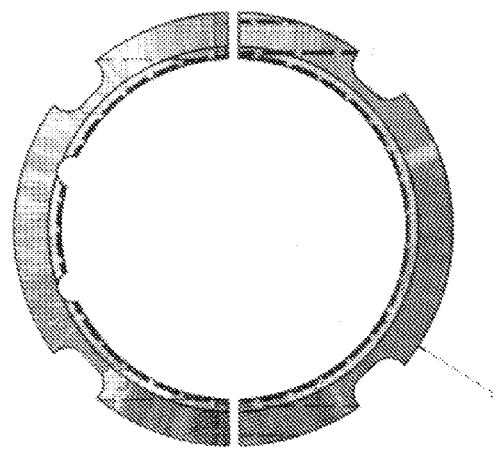
FIG. 4D shows an end view of the coupler of FIG. 4A.
Figure 4C:
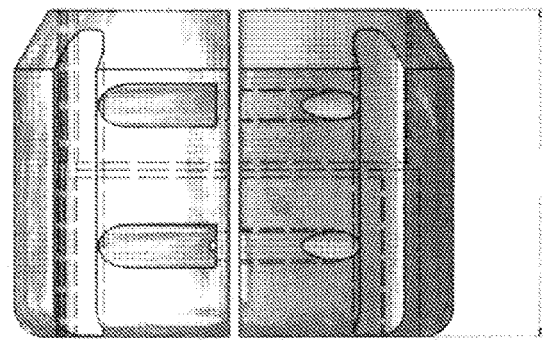
FIG. 4C shows a side view of the coupler of FIG. 4A.

FIG. 4A shows an isometric leading edge view of another exemplary embodiment of a coupler similar to the design of FIG. 3A. FIG. 4B shows a trailing edge isometric view of the coupler of FIG. 4A. FIG. 4C shows a side view of the coupler of FIG. 4A, and FIG. 4D shows an end view of the coupler of FIG. 4A.

Example 2

A coupler according to FIG. 3A was fabricated for use with a 4" pipe and protective sock. The overall radius to the outer side wall was 2.85" in a width direction and the coupler length was 4.3".

Example 3

Figures 5A, 5B:
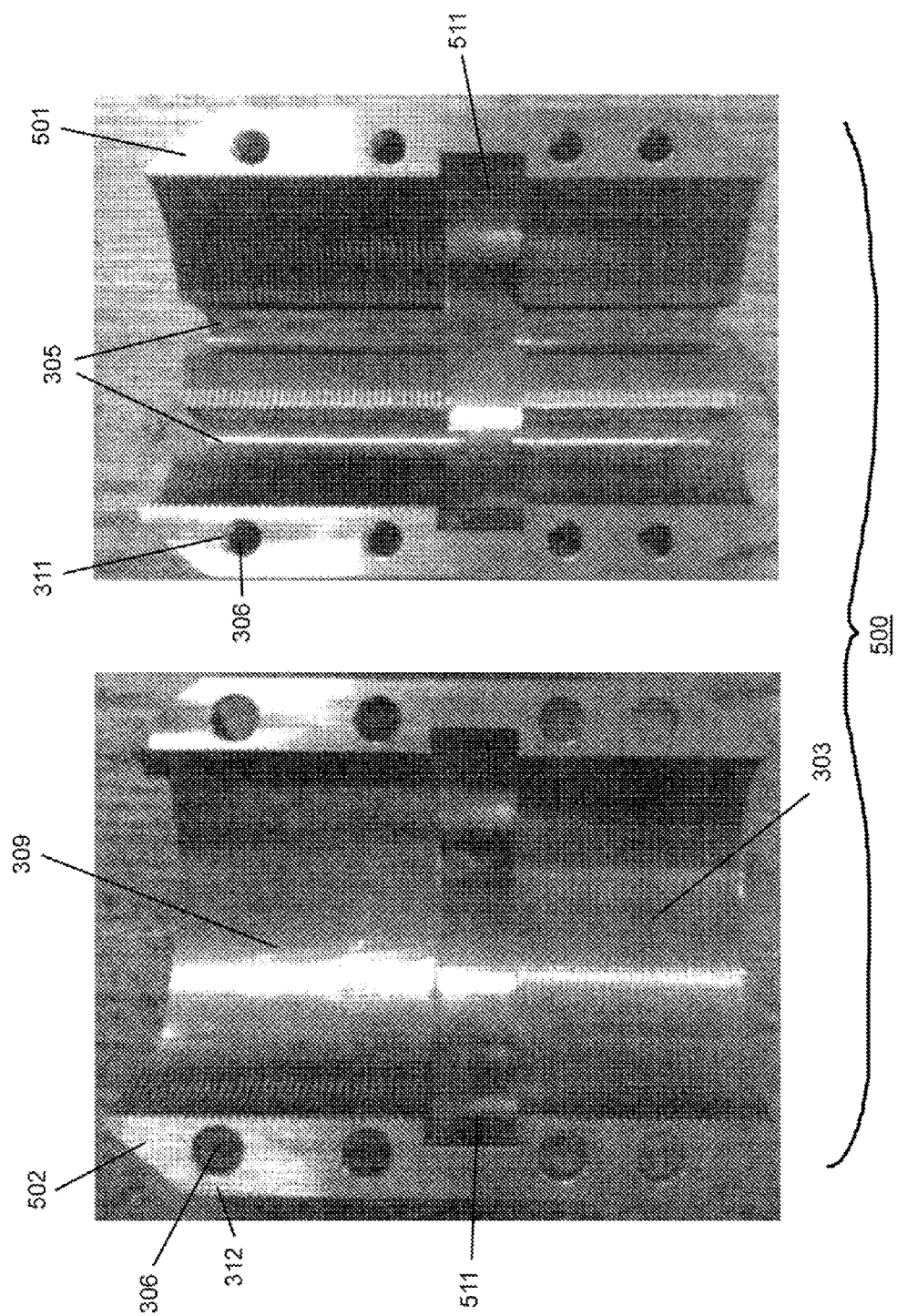
FIG. 5A shows an illustration of a second half of one exemplary coupler.
FIG. 5B shows an illustration of the first half the same exemplary coupler of FIG. 5A.

An illustration of the second half 502 of a coupler 500 having similar design as shown in the drawings of FIG. 3A and FIG. 4A is shown in FIG. 5A, and an illustration of the first half 501 of the coupler 500 is shown in FIG. 5B. Coupler 500 was fabricated from an AISI 1144 Carbon Steel material. In the exemplary coupler 500, there is an additional transverse slot 511 feature. Such a slot 511 can provide space for an edge seam around the end of a protective sock and/or allow for some sock material to bulge into the coupler.

FIG. 6A shows an illustration of a coupler capture of a sock to a pipe during the formation of the sock seam. FIG. 6B shows a close up illustration of the coupler of FIG. 6A.

The leading edge slope of a coupler typically remains about the same slope, and is generally independent of the diameter of the coupler. In some embodiments of a coupler, there could be a somewhat modified slope and/or slope profile related to the length of the coupler.

A coupler as described herein can be fabricated from steel, such as for example an AISI 1144 Carbon Steel, 4140 heat treated stressed relieved (HTSR), 1045 Carbon Steel and any other suitable steel.

A coupler as described herein can be manufactured using any suitable fabrication method. Suitable exemplary machining processes include computer numerical control (CNC) lathes and mills.

Generally a coupler intended for use with metallic pipes, such as steel pipe, can be made from relatively harder steel (e.g. a heat treated steel) for a longer and more reliable re-usable coupler service life. Also, the angle of serrations (i.e. gripping serrations) can be varied to better grip metallic pipes or plastic pipes. There can be a trade-off between best gripping characteristics of the serrations and minimal grip markings left on the pipe after removal of the re-usable coupler.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A coupler apparatus for installing a pipe and a protective sock cover into a borehole comprising:
    a pipe and a protective sock cover;
    a first coupler half and a second coupler half, both halves comprising a leading edge to stabilize a soil matrix as said pipe and said protective sock cover are inserted into the borehole, and at least one slot disposed in an outer surface to allow a fluid to pass by said coupler apparatus as said coupler apparatus is pulled through said borehole;
    a plurality of bolts to join said first coupler half to said second coupler half about said pipe and said protective sock cover, wherein said coupler apparatus formed by said first coupler half joined to said second coupler captures said protective sock cover at a location on said pipe at a distance of greater than about six inches from a first end of the pipe which is to be mechanically coupled to an installation apparatus to install the pipe and protective sock cover into the borehole, and wherein the installation apparatus is not directly coupled to said coupler for the installation of said pipe with said protective sock cover into said borehole; and
    wherein at least a selected one of said first coupler half and said second coupler half further comprises at least one slot to clamp a tracer wire such that said tracer wire is not pressed against a wall of the borehole by an angular deflection of the pipe caused by a pipe buoyancy in a borehole water or a borehole slurry such that said tracer wire remains substantially undamaged.

2. The coupler apparatus of claim 1, wherein at least a selected one of said first coupler half and said second coupler half further comprises a transverse slot.

3. The coupler apparatus of claim 1, wherein at least a selected one of said first coupler half and said second coupler half further comprises a plurality of serrated features.

4. The coupler apparatus of claim 1, wherein at least a selected one of said first coupler half and said second coupler half further comprises a substantially smooth section configured to protectively capture a seam.

5. The coupler apparatus of claim 1, wherein said first coupler half and said second coupler half comprise steel.

6. The coupler apparatus of claim 5, wherein said steel comprises an AISI 1144 Carbon Steel.

7. A method comprising the steps of:
    providing a pipe and a protective sock cover to be installed into a borehole;
    providing a first coupler half and a second coupler half;
    affixing said first coupler half to said second coupler half about said pipe and said protective sock cover to capture said protective sock cover at a location on said pipe, said location on said pipe about six inches or more from an end of said pipe which is to be mechanically coupled to an installation apparatus to install the pipe and protective sock cover into the borehole, and wherein the installation apparatus is not directly coupled to said coupler;
    affixing an installation apparatus substantially at said end of said pipe; and
    installing said pipe and said protective sock cover into said borehole while a fluid passes through at least one slot disposed in said first coupler half and said second coupler half.

8. The method of claim 7, wherein said step of installing said pipe and said protective sock cover into said borehole further comprises using a leading sloped edge of said first coupler half and said second coupler half to pack or stabilize a soil matrix as said pipe and said protective sock cover is inserted into said borehole.

9. The method of claim 7, wherein said step of affixing said first coupler half to said second coupler half about said pipe and said protective sock cover further comprises affixing said first coupler half to said second coupler half about at least one tracer wire clamped within a tracer wire slot.

10. The method of claim 7, further comprising after said step of installing said pipe and said protective sock cover into said borehole a step of removing said first coupler half and said second coupler half.

\* \* \* \* \*